(12) United States Patent
Yen et al.

(10) Patent No.: US 8,197,975 B2
(45) Date of Patent: Jun. 12, 2012

(54) FUEL CELL SYSTEM

(75) Inventors: Tzu-Hsiang Yen, Taoyuan County (TW); Wen-Tang Hong, Taoyuan County (TW); Yu-Ching Tsai, Taoyuan County (TW); Hung-Yu Wang, Taoyuan County (TW); Wei-Ping Huang, Taoyuan County (TW); Ming-Dar Lin, Taoyuan County (TW); Chen-Po Lai, Taoyuan County (TW); Cheng-Nan Huang, Taoyuan County (TW)

(73) Assignee: Atomic Energy Council Institue of Nuclear Research, Longtan Township, Taoyuan County (TW)

( * ) Notice: Subject to any disclaimer, the term of this patent is extended or adjusted under 35 U.S.C. 154(b) by 166 days.

(21) Appl. No.: 12/689,752

(22) Filed: Jan. 19, 2010

(65) Prior Publication Data

US 2011/0177409 A1    Jul. 21, 2011

(51) Int. Cl.
*H01M 8/06* (2006.01)

(52) U.S. Cl. .......................... 429/423; 429/400; 429/417

(58) Field of Classification Search .................... 429/423
See application file for complete search history.

(56) References Cited

U.S. PATENT DOCUMENTS

2007/0196704 A1*  8/2007  Valensa et al. .................. 429/20
2010/0055517 A1*  3/2010  Uzhinsky et al. ............... 429/17

* cited by examiner

*Primary Examiner* — Barbara Gilliam
*Assistant Examiner* — Gary Harris
(74) *Attorney, Agent, or Firm* — Jackson IPG PLLC; Demian K. Jackson

(57) ABSTRACT

A fuel cell system includes a fuel cell unit, a reformer with a catalyst and heat pipes around the catalyst, and a combustor connected to the heat pipes. A first fuel pipe sends fuel into the reformer. The fuel is reformed in the reformer. A first air port sends air into the reformer. An anode pipe sends the reformed fuel into the fuel cell unit. The chemical reaction of the reformed fuel occurs in the fuel cell unit. A cathode pipe sends the air into the fuel cell unit. A residual reformed fuel pipe sends residual reformed fuel into the combustor. A hot air pipe sends hot air into the combustor. The residual reformed fuel pipe is mixed with the hot air and burned in the combustor. A second fuel pipe sends more fuel into the combustor if necessary. A second air port sends air into the combustor if necessary.

9 Claims, 3 Drawing Sheets

FUEL CELL SYSTEM

FIELD OF INVENTION

The present invention relates to a fuel cell system and, more particularly, to a fuel cell system including a heat-recovery device based on heat pipes.

BACKGROUND OF INVENTION

Referring to FIG. 3, a conventional fuel cell system includes a fuel cell unit 40, a reformer 41, a fuel supply 42, a mixing unit 43, a combustor 44 and a heat exchanger 45. The reformer 41 is connected to the fuel supply 42 through a pipe 421. The reformer 41 is connected to the fuel cell unit 40 through pipes 422 and 423. The mixing unit 43 is connected the fuel cell unit 40 and the reformer 41. The combustor 44 is connected to the mixing unit 43. The heat exchanger 45 is connected to the combustor 44. The heat exchanger 45 includes a fresh air port 451, an exhaust port 452 and a hot air port 453. The heat exchanger 45 is connected to the fuel cell unit 40 through the hot air port 453. In use, fuel is sent into the reformer 41 from the fuel supply 42 via the pipe 421. The fuel is reformed into hydrogen-rich gas in the reformer 41. The hydrogen-rich gas is sent into the fuel cell unit 40 via the pipe 422. Chemical reaction of the hydrogen-rich gas occurs in the fuel cell unit 40 to generate electricity. Residual hydrogen-rich gas and hot air is sent into the mixing unit 43 from the fuel cell unit 40. The residual hydrogen-rich gas is mixed with the hot air and/or more fuel in the mixing unit 43. The mixture is sent into the combustor 44 from the mixing unit 43. The mixture is burned in the combustor 44. Exhaust from the combustion is sent into the heat exchanger 45 from the combustor 44. Fresh air is sent into the heat exchanger 45 from the atmosphere via the fresh air port 451. Heat exchange occurs in the heat exchanger 45. Hot air is sent into the fuel cell unit 40 from the heat exchanger 45 through the hot air port 453. The exhaust is expelled from the heat exchanger 45 through the exhaust port 452.

The conventional fuel cell system can make use of the residual hydrogen-rich gas. However, the efficiency of the heat exchanger 45 is low for including a finned-type convective heat transfer mechanism.

Therefore, the present invention is intended to obviate or at least alleviate the problems encountered in prior art.

SUMMARY OF INVENTION

It is the primary objective of the present invention to provide an efficient fuel cell system.

To achieve the foregoing objective, the fuel cell system includes a fuel cell unit, a reformer with a catalyst and heat pipes around the catalyst, and a combustor connected to the heat pipes. A first fuel pipe sends fuel into the reformer so that the fuel is reformed in the reformer. A first air port sends fresh air into the reformer. An anode pipe sends the reformed fuel into the fuel cell unit so that chemical reaction of the reformed fuel occurs in the fuel cell unit. A cathode pipe sends the fresh air into the fuel cell unit. A residual reformed fuel pipe sends residual reformed fuel into the combustor. A hot air pipe sends hot air into the combustor so that the residual reformed fuel pipe is mixed with the hot air and burned in the combustor. A second fuel pipe sends more fuel into the combustor if necessary. A second air port sends more fresh air into the combustor if necessary. An exhaust port expels exhaust.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 1:
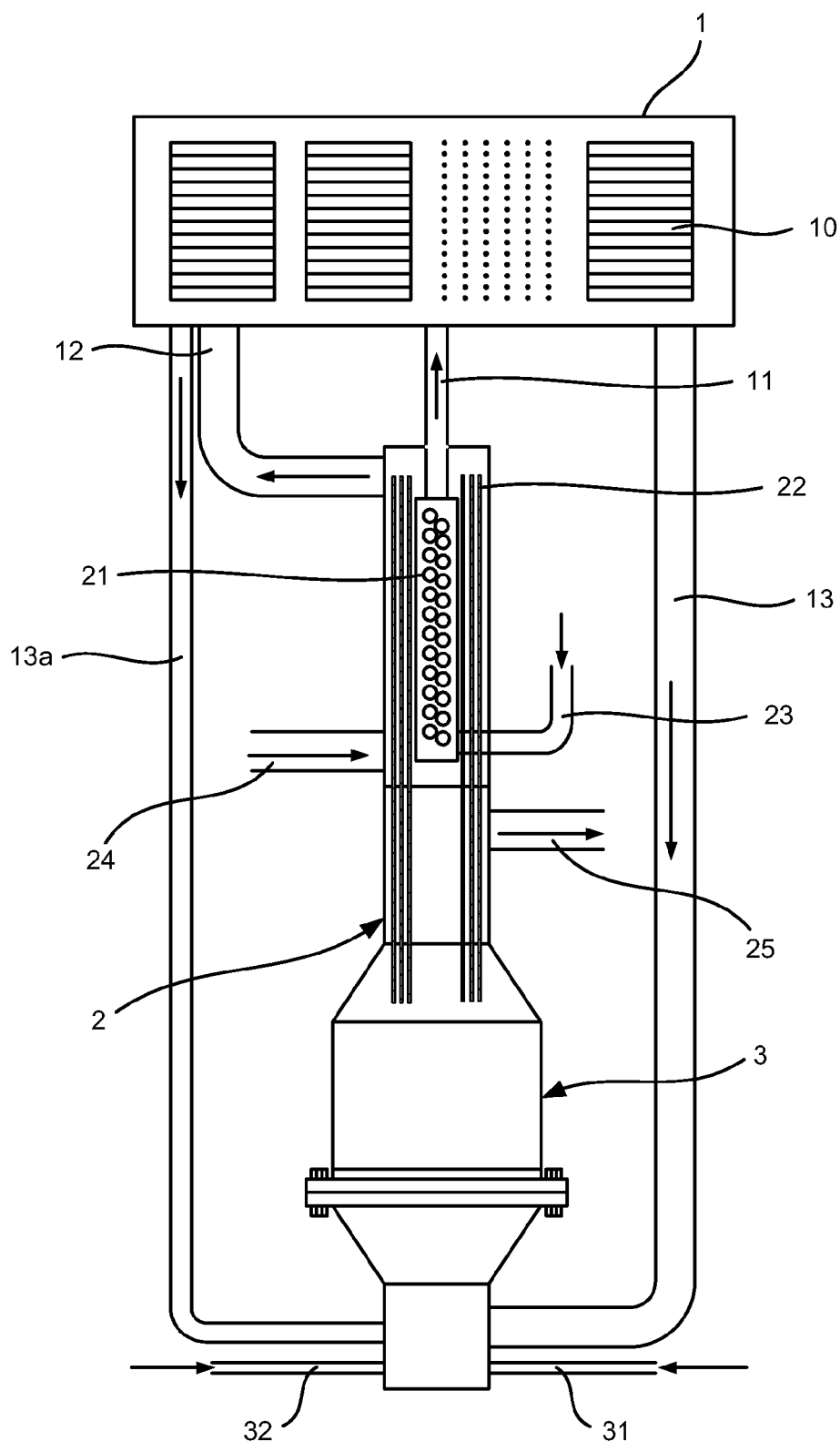
FIG. 1 is a top view of a fuel cell system according to the preferred embodiment of the present invention.
Figure 2:
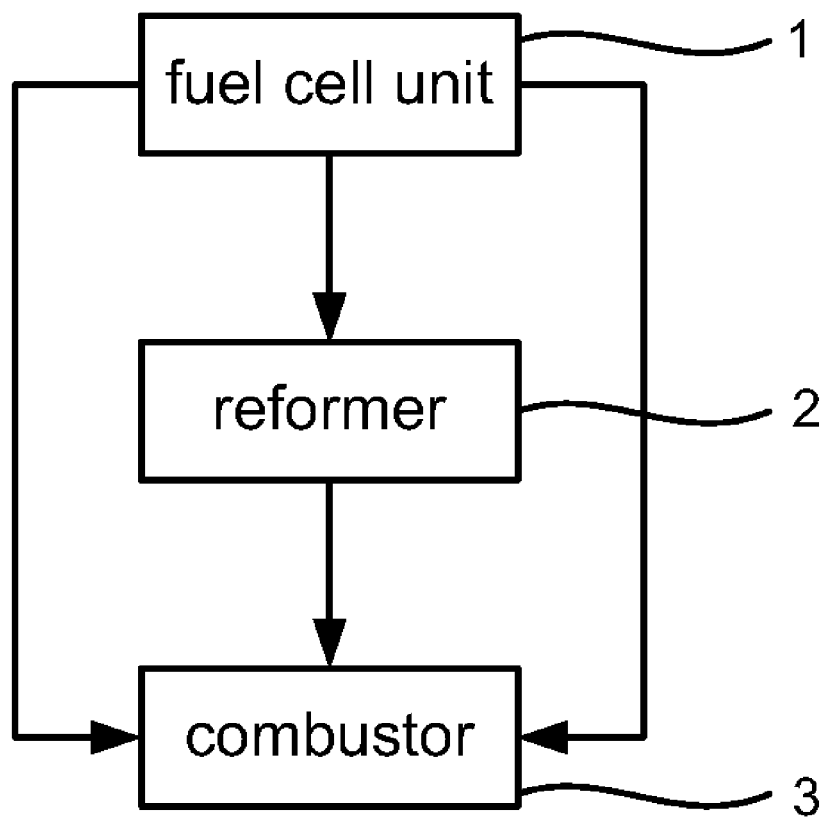
FIG. 2 is a block diagram of the fuel cell system shown in FIG. 1.
Figure 3:
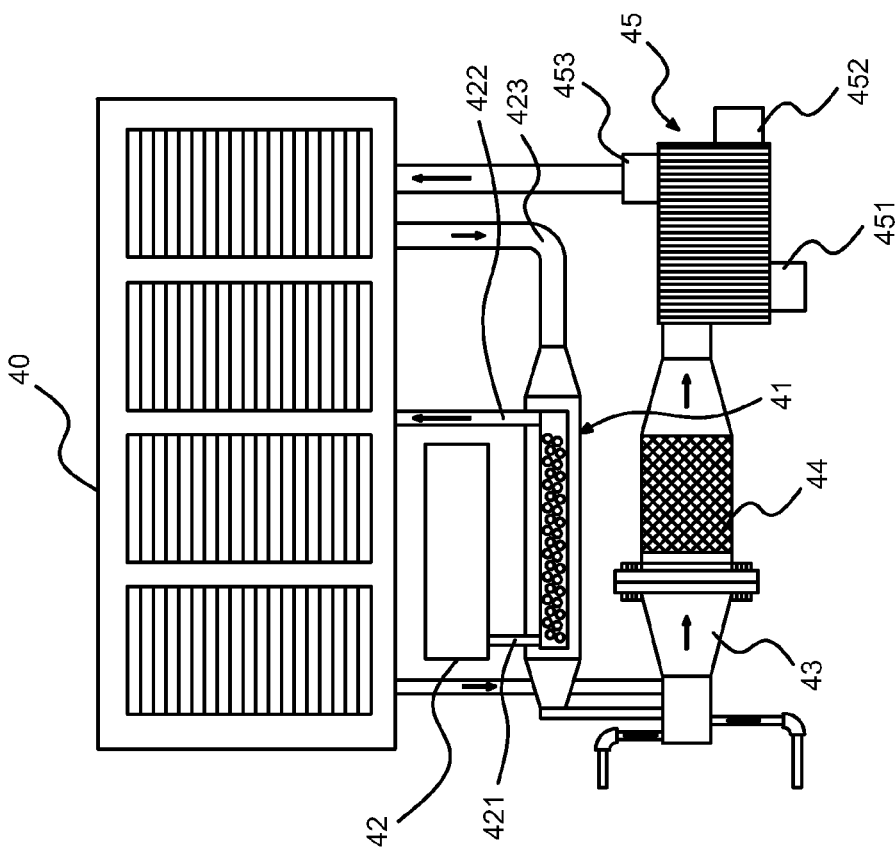
FIG. 3 is a top view of a conventional fuel cell system.

Referring to FIGS. 1 and 2, a fuel cell system includes a fuel cell unit 1, a reformer 2 and a combustor 3 according to the preferred embodiment of the present invention. The fuel cell unit 1 includes fuel cell stacks 10.

The reformer 2 includes a catalyst 21 and heat pipes 22 provided near the catalyst 21. The catalyst 21 is preferably made of platinum. The catalyst 21 is connected to an anode of the fuel cell unit 1 through an anode pipe 11. Sodium or potassium is preferably filled in the heat pipes 22. The heat pipes 22 are connected to the cathode of the fuel cell unit 1 through a cathode pipe 12. The reformer 2 is connected to a first fuel supply through a first fuel pipe 23.

The combustor 3 is connected to the reformer 2 via the heat pipes 22. The combustor 3 is connected to an anode of the fuel cell unit 1 through a pipe 13. The combustor 3 is connected to a cathode of the fuel cell unit 1 through another pipe 13a. The combustor 3 is connected to a second fuel supply through a second fuel pipe 31.

In use, the first fuel is sent into the reformer 2 from the first fuel supply via the first fuel pipe 23. The first fuel may be natural gas or any proper hydrocarbon fuel. Fresh air is sent into the reformer 2 from the atmosphere via a first fresh air port 24. The temperature of the fresh air is about 25 degrees Celsius. The first fuel and the fresh air are reformed into hydrogen-rich gas in the reformer 2.

The hydrogen-rich gas is sent into the fuel cell unit 1 from the reformer 2. Chemical reaction of the hydrogen-rich gas occurs in the fuel cell unit 1 to generate electricity.

Residual hydrogen-rich gas is sent into the combustor 3 from the anode of the fuel cell unit 1 via the pipe 13. Hot air is sent into the combustor 3 from the cathode of the fuel cell unit 1 via the pipe 13a. The residual hydrogen-rich gas is mixed with the hot air and the mixture is combusted in the combustor 3. Heat is sent to the catalyst 21 from the combustor 3 through the heat pipes 22 to facilitate the reforming of the first fuel and fresh air into the hydrogen-rich gas before the hydrogen-rich gas is sent into the anode of the fuel cell unit 10 via the anode pipe 11. In addition, the heat heats the fresh air before the fresh air is sent into the cathode of the fuel cell unit 10 through the cathode pipe 12. The temperature of the heat pipes 22 is about 600 to 1200 degrees Celsius.

If the heat from the combustion of the residual hydrogen-rich gas and the hot air hot air is inadequate, second fuel is sent into the combustor 3 from the second fuel supply via the second fuel pipe 31. The second fuel may be natural gas. More fresh air may be sent into the combustor 3 through a second air port 32 for cooling if necessary. The residual hydrogen-rich gas, hot air and second fuel are mixed with one another and the mixture is combusted in the combustor 3. Exhaust is expelled via an exhaust port 25.

The fuel cell system can make use of the residual hydrogen-rich gas. Moreover, the efficiency of the heat pipes 22 is high.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A fuel cell system comprising:
   a fuel cell unit;
   a reformer coaxially arranged directly below the fuel cell unit and comprising a catalyst and heat pipes arranged around the catalyst;
   a combustor coaxially arranged directly below the reformer and connected to the heat pipes;
   a first fuel pipe sending first fuel into the reformer so that the first fuel is reformed in the reformer;
   a first air port sending atmospheric air into the reformer from the atmosphere;
   an anode pipe sending the reformed fuel into an anode of the fuel cell unit from the catalyst so that chemical reaction of the reformed fuel occurs in the fuel cell unit to provide electricity;
   a cathode pipe sending the atmospheric air into a cathode of the fuel cell unit from the reformer;
   a residual reformed fuel pipe sending residual reformed fuel into the combustor from the anode of the fuel cell unit;
   a heated air pipe sending residual heated air into the combustor from the cathode of the fuel cell unit so that the residual reformed fuel is mixed with the residual heated air and the mixture is combusted in the combustor;
   a second fuel pipe sending second fuel into the combustor if necessary;
   a second air port sending more atmospheric air into the combustor if necessary; and an exhaust port expelling exhaust.

2. The fuel cell system according to claim 1, wherein the fuel cell unit comprises fuel cell stacks.

3. The fuel cell system according to claim 1, wherein the catalyst is made of platinum.

4. The fuel cell system according to claim 1, wherein the temperature of the heat pipes is 600 to 1200 degrees Celsius in use.

5. The fuel cell system according to claim 1, wherein the heat pipes are filled with a material selected from a group consisting of sodium and potassium.

6. The fuel cell system according to claim 1, wherein the first fuel is selected from a group consisting of natural gas and hydrocarbon fuels.

7. The fuel cell system according to claim 1, wherein the temperature of the atmospheric air sent through the first air port is 25 degrees Celsius.

8. The fuel cell system according to claim 1, wherein the second fuel is natural gas.

9. The fuel cell system according to claim 1, wherein the atmospheric air is sent via the second air port for cooling.

* * * * *